May 2, 1967  J. H. YOUNG  3,316,796
SELF-DRILLING EXPANSION ANCHOR BOLT
Filed June 24, 1965  2 Sheets-Sheet 1

INVENTOR
JACOB H. YOUNG
BY
Alfred Petchaft
ATTORNEY

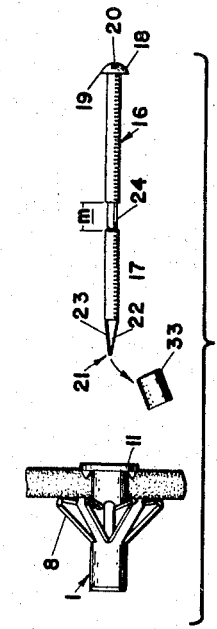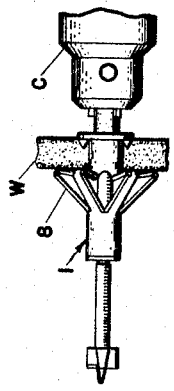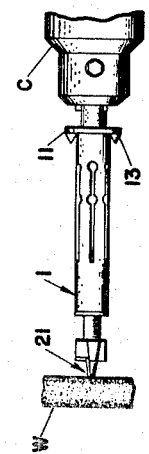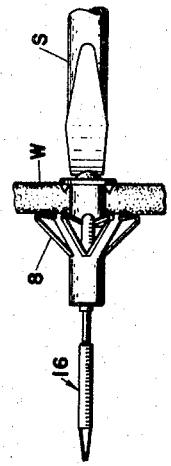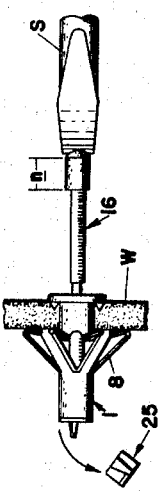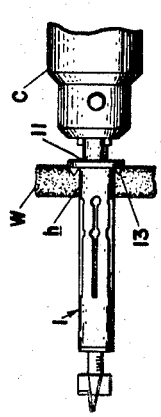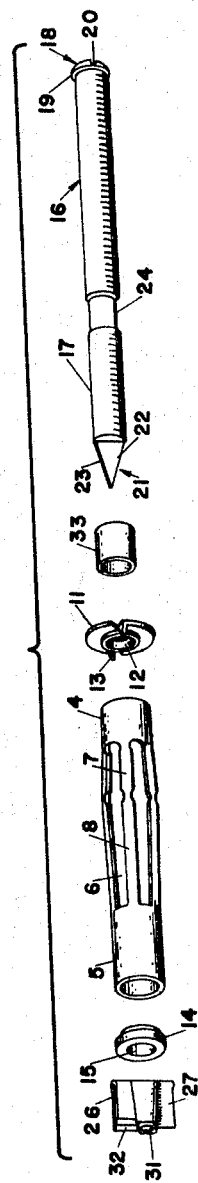

United States Patent Office 3,316,796
Patented May 2, 1967

3,316,796
SELF-DRILLING EXPANSION ANCHOR BOLT
Jacob H. Young, Glendale, Mo.
(1415 S. 18th St., St. Louis, Mo. 63104)
Filed June 24, 1965, Ser. No. 466,736
4 Claims. (Cl. 85—68)

This invention relates in general to certain new and useful improvements in anchor bolts and, more particularly, to an anchor bolt adapted for rapid insertion in a wall by use of a conventional drill or brace.

During the past decade, so-called dry wall construction has experienced increased popularity in the construction industry for interior walls of buildings. Such construction, owing to its comparatively thin width, lends itself ideally to the acceptance of anchor bolts which are used for fastening a great variety of objects to the walls in which they are secured. Anchor bolts provide a rigid and reliable support and consequently have replaced nails for supporting such heavy objects as mirrors, wall partitions, cabinets, and the like.

Conventional anchor bolts generally include a bolt fitted through a fluted sleeve, the sleeve being provided at the end opposite the bolt head with a nut which engages the threads of the bolt. To install such an anchor bolt, one must drill a hole in the wall large enough to accept the sleeve which is inserted through it. The bolt is then tightened causing the nut to draw near the head thereof and the flutes of the sleeve to bow outwardly and back against the rear face of the wall, thereby rigidly locking the expanded sleeve and the nut within the wall. Once the sleeve is locked within the wall the bolt can be withdrawn and inserted through a hook, bracket, or any other device which one desires to secure to the wall.

Installation of conventional anchor bolts is a time-consuming operation, for a hole must first be drilled and after the anchor bolt is fitted through it the bolt must be tightened by hand to expand the sleeve and draw it against the rear face of the wall. Additionally, in the case of the ordinary homeowner, such anchor bolts are often either avoided or installed incorrectly, because the homeowner rarely has the correct size drill bit or a drill large enough to accept it. Consequently, the homeowner often attempts to force the sleeve through an inadequately sized hole and breaks considerable plaster away from the rear of the wall, or else attempts to ream the hole and achieves the same destructive end.

It is therefore the primary object of the present invention to provide an anchor bolt which can be rapidly installed in a supporting structure such as a wall by use of a conventional hand drill, electric drill, or brace.

It is a further object of the present invention to provide an anchor bolt of the type stated which can be installed in a two-step operation without first drilling a hole in the wall by using a separate bit.

It is another object of the present invention to provide an anchor bolt of the type stated which is simple in construction and economical in cost.

With the above and other objects in view, my invention resides in the novel features of form, construction, arrangement, and combination of parts presently described and pointed out in the claims.

In the accompanying drawings (2 sheets):

FIG. 5 is an exploded perspective view of the anchor bolt; and

FIGS. 6 through 11 are side-elevational views showing the installation of the anchor bolt in progressive steps.

Figure 1:
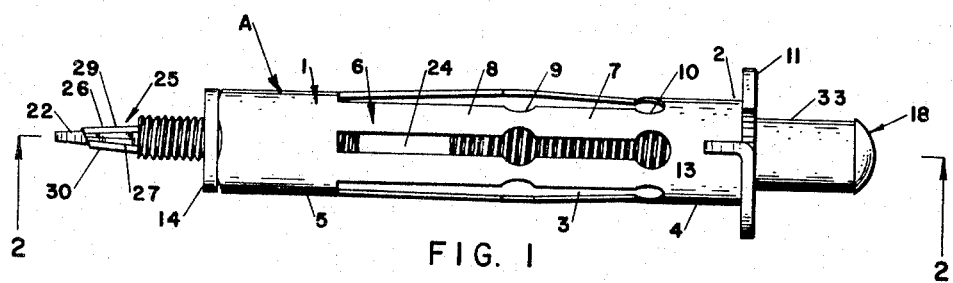
FIG. 1 is a side-elevational view of an anchor bolt constructed in accordance with and embodying the present invention.

Referring now in more detail and by reference characters to the drawings which illustrate a preferred embodiment of the present invention, A designates an anchor bolt including an expansible anchor sleeve 1 having a tubular collar 2 which is provided with a plurality circumferentially spaced axially extending slits 3 defining continuous sleeve-like end portions 4, 5 which are preferably of equal diametral size and are connected in axially spaced relation by a plurality of longitudinal bands 6. The end portion 4 is slightly greater in axial length than the thickness of the wall W into which the anchor A is fastened, reference being made to FIG. 7. The connecting bands 6 are bowed slightly outwardly in the provision of angularly inclined legs 7, 8. At the junctures of the legs 7, 8, the bands 6 are relieved in the provision arcuate cut-outs 9. Similarly, at the juncture of the legs 7 and the end portion 4 between the bands 6, the collar 2 is provided with arcuate cut-outs 10, all for purpose presently more fully appearing. The collar 2 can be easily and economically shaped from a flat piece of sheet steel or other suitable material and then rolled into the cylindrical shape.

Spot welded or otherwise rigidly fastened to end portion 4 is an annular wall engaging flange plate 11 which is centrally provided with an aperture 12 and on each side thereof with inwardly struck wall penetrating prongs 13. Similarly, spot welded to the end portion 5 is annular disk 14 which is diametrally equivalent to the end portions 4, 5 of collar 2. Disk 14 is centrally provided with a threaded aperture 15 for purpose presently more fully appearing.

Extending through the collar portion 2 is a bolt 16 having a threaded shank 17 which engages the threads of aperture 15. At one end the bolt 16 is provided with a convention "round head" 18 having a circular side-margin 19 and a screw-driver slot 20. Side-margin 19 can be grasped by the jaws of a drill chuck C or other similar device as will presently be described in greater detail. Both aperture 15 and shank 17 are provided with conventional right-hand threads which draw the disk 14 toward the head 18 when a clockwise rotation is imparted to the latter.

At its other end the bolt 16 is ground down in the provision of a V-shaped point 21 having parallel flat side faces 22 and cutting edges 23, the edges 23 being beveled to cut when a clockwise rotation is imparted to head 18 of bolt 16. Intermediate its ends, the shank 17 is provided with a diametrally reduced portion 24 having an axial dimension $m$, all for purposes presently more fully appearing. Diametrally reduced portion 24 has not threads and fits slidably through the aperture 15.

Figure 2:
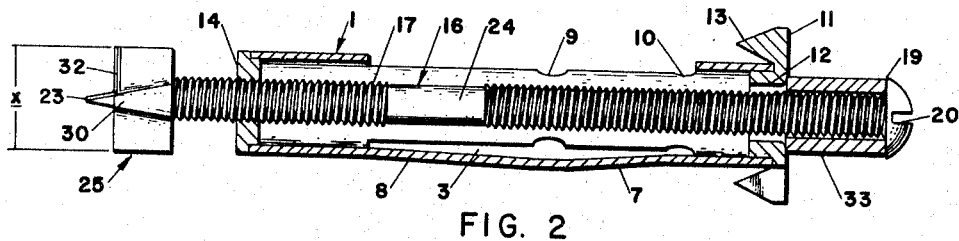
FIG. 2 is a sectional view taken along line 2—2 of FIG. 1.
Figure 3:
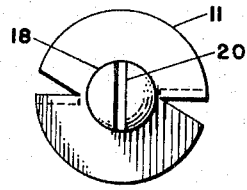
FIG. 3 is a front elevational view of the anchor bolt.
Figure 4:
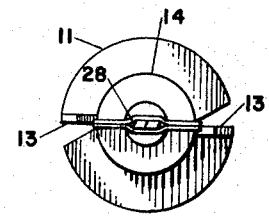
FIG. 4 is a rear elevational view of the anchor bolt.

Fitted snugly over the point 21 is a cutter element 25 which is, in effect, a piece of metal folded over on itself whereby to provide two walls 26, 27. Along the fold line joining the walls 26, 27, the cutter element 25 is centrally provided with an elongated aperture 28 sized to accommodate the end portion of the point 21. Rearwardly from the aperture 28, the walls 26, 27 are outwardly stamped in the provision of truncated V-shaped grooves 29, 30, respectively, which when the walls 26, 27 are brought face to face form a pocket 31, the walls of pocket 31 being adapted to snugly embrace the side faces 22 of point 21 and prevent the cutter element 25 from slipping off. The juxtaposed end margins 5 on each side of the pocket 30 whereby to, in effect, form an envelope-like structure which is pressed over the point 21 so that the tip thereof protrudes beyond the aperture 28. The cutter element 25 is held on the point 21 by virtue of the frictional engagement and tight fit between the internal faces of the grooves 29, 30 and the flattened side faces 22 of point 21. The leading margin of cutter element 25, that is to say, the fold or left margin as seen in FIG. 2, is ground down on each side of aperture 28 in the provision of cutting edges 32 which are beveled so as to cut when a clockwise rotation is imparted to the head 18 of bolt 16. It should be noted that the transverse width of the cutter element 25, that is to say, the distance $x$ as seen in FIG. 2, is slightly greater than the diameter of collar 2 in order that the hole bored thereby can slidably accommodate the collar 2.

Interposed between the head 18 of the bolt 16 and the flange plate 11 is a cylindrical spacer sleeve 33, the external diameter of which is slightly less than the diameter of side-margin 19 of bolt head 18 whereby to provide a slight annular projection which can be grasped by the jaws of the drill chuck C or other similar device. Spacer sleeve 33 has an axial dimension $n$ which is somewhat greater than the dimension $m$ of diametrally reduced portion 24.

Referring now to FIGS. 6 through 11, the anchor A is inserted into the wall W by first inserting head 18 and the spacer sleeve 33 in the chuck C is a conventional electric drill, hand drill, or brace, the jaws thereof being brought into snug embracement with the sides of the sleeve 33 and the side-margin 19 of bolt head 18. The drill is then positioned so that the tip of point 21 is against the place on the wall where it is desired to emplace the anchor A. When the chuck C is rotated the cutting edges 23 of point 21 will bore into wall W forming a conical hole therein. When the cutting edges 32 of cutter element 25 engage the wall, they will bore a hole $h$ therethrough having a diameter equal to the dimension $x$ of the cutter element 25. Once the hole $h$ is completed the collar 2 will pass therethrough until the flange plate 11 abuts against the outer surface of wall W as best seen in FIG. 7. In such a position the prongs 13 bear into the wall W and prevent the sleeve 1 from rotating with respect thereto. Continued rotation of the chuck C draws the end portion 5 toward the end portion 4 on the threads of shank 17 until the disk 14 encounters the diametrally reduced portion 24, as best seen in FIG. 8. When this position is reached the bolt 16 will rotate within the threaded aperture 15, but the end portion 5 will not move any further toward the end portion 4. In such a position, the bands 6 will be bowed outwardly and a portion of the legs 7 will be in abutment with rear face of the wall W in surrounding relation to the hole $h$, thereby holding the sleeve firmly in the wall W. The cut-outs 9, 10, of course, provide a line of weakness for the bending of the legs 7 with respect to the end portion 4 and leg 8.

Thereafter, the chuck C is loosened and the drill is removed. The bolt 16 is pulled outwardly until the threads of shank 17 again engage the threads of aperture 15, whereupon the bolt 16 is threaded outwardly with a screwdriver S, the cutter element 25 being ultimately brought into abutment with the disk 14 and urged off of the point 21, as illustrated in FIG. 9. The bolt 16 is then completely withdrawn from the sleeve 1 and the spacer sleeve 33 removed therefrom. Finally, the bolt 16 is again inserted into the sleeve 1 and threaded into the aperture 15. This time the sleeve 33 is not present to prevent engagement with the threads beyond the diametrally reduced portion 24 and the bolt head 18 can be screwed up into facewise abutment with the flange plate 11, as seen in FIG. 11. Of course, a picture hanger or wall of a cabinet can be interposed between the head 18 and flange plate 11 and thereby held securely to wall W.

It should be noted that wall anchor A can be inserted by using only two conventional hand tools, namely, an ordinary electric drill, hand drill, or brace and a screwdriver. The need for an expensive set of drill bits is obviated for the anchor itself serves as a bit and drills a correctly sized hole $h$ in the wall W, thereby eliminating the tendency of those who do not have the right size bit to force the sleeve 1 through an inadequately sized hole and unnecessarily crack the wall W. The diametral size of spacer 33 and side-margin 19 of bolt head 18 is considerably less than the distance $x$ between the side margins of the cutter element 24. Thus, a relatively large hole $h$ can be drilled by using a drill having a comparatively small chuck.

It should be understood that changes and modifications in the form, construction, arrangement, and combination of the several parts of the wall anchor bolt may be made and substituted for those herein shown and described without departing from the nature and principle of my invention.

Having thus described my invention, what I claim and desire to secure by Letters Patent is:

1. An anchor bolt for insertion in a wall; said bolt comprising an expansible sleeve having a threaded end portion at one end and a flange plate at its other end with an expansible collar portion therebetween, said collar portion having axially extending slits therein, a bolt fitted through said sleeve and having threads for engaging the threads of said threaded end portion, said threaded end portion adapted to advance toward said flange plate when said bolt is rotated in a preselected direction relative to said sleeve whereby to expand said collar portion of said sleeve, said bolt being provided at one end with a head projecting beyond said flange plate and being provided with a point at its other end, said point having a substantially flat removable cutter element thereon having cutting edges for boring a hole through a wall when rotation in said preselected direction is imparted to said bolt, said bolt being provided intermediate its ends with a diametrically reduced portion to slidably fit within said threaded end portion.

2. An anchor bolt for insertion in a wall; said bolt comprising a sleeve having a threaded end portion, a flange plate, and an expansible collar portion rigidly secured to and interposed between said threaded end portion and said flange plate, said flange plate being provided with inwardly projecting prongs adapted to engage a wall whereby to prevent said sleeve from rotating with respect thereto, said collar portion having a plurality of circumferentially spaced axially extending slits defining a plurality of axially extending bands, a bolt slidably fitted through said flange plate and collar portion and having threads for engaging the threads of said threaded end portion, said bolt being provided at one end with a head projecting beyond said flange plate and at its other end with a cutter element projecting beyond said threaded end portion, said bolt being provided intermediate its ends with a diametrally reduced portion sized to slidably fit within said threaded end portion, said cutter element being sized and adapted to drill a hole through a wall for slidably accepting said collar portion when rotation in a preselected direction is imparted to said bolt, said bolt being adapted to draw said threaded end portion toward said flange plate until said diametrally reduced portion is encountered whereby to axially compress said collar portion and bow said bands outwardly so that said sleeve cannot be removed from said wall.

3. An anchor bolt for insertion in a wall; said bolt comprising an expansible sleeve having a threaded end portion, a flange plate, and an expansible collar portion rigidly secured to and interposed between said threaded end portion and said flange plate, said flange plate being provided with inwardly projecting prongs adapted to engage a wall whereby to prevent said expansible sleeve from rotating with respect thereto, said collar portion having a plurality of circumferentially spaced axially extending slits defining a plurality of axially extending bands, a bolt slidably fitted through said flange plate and collar portion and having threads for engaging the threads of said threaded end portion, said bolt being provided at one end with a head projecting beyond said flange plate and at its other end with a cutter element projecting beyond said threaded end portion, said bolt being provided intermediate its ends with a diametrally reduced portion sized to slidably fit within said threaded end portion, a spacer sleeve interposed between the head of said bolt and said flange plate, said cutter element being sized and adapted to drill a hole through a wall for slidably accepting said collar portion when rotation is a preselected direction is imparted to said bolt, said bolt being adapted to draw said threaded end portion toward said flange plate until said diametrally reduced portion is encountered whereby to axially compress said collar portion and bow said bands outwardly so that said expansible sleeve cannot be removed from said wall.

4. An anchor bolt for insertion in a wall; said bolt comprising an expansible sleeve having a threaded end portion, a flange plate, and an expansible collar portion rigidly secured to and interposed between said threaded end portion and said flange plate, said flange plate being provided with inwardly projecting prongs adapted to engage a wall whereby to prevent said expansible sleeve from rotating with respect thereto, said collar portion having a plurality of circumferentially spaced axially extending slits defining a plurality of axially extending bands, a bolt slidably fitted through said flange plate and collar portion and having threads for engaging the threads of said threaded end portion, said bolt being provided at one end with a head projecting beyond said flange plate and at its other end with a cutter element projecting beyond said threaded end portion, said bolt being provided intermediate its ends with a diametrally reduced portion sized to slidably fit within said threaded end portion, a spacer sleeve interposed between the head of said bolt and said flange plate, said spacer sleeve being greater in axial length than said diametrally reduced portion of said bolt, said cutter element being sized and adapted to drill a hole through a wall for slidably accepting said collar portion when rotation in a preselected direction is imparted to said bolt, said bolt being adapted to draw said threaded end portion toward said flange plate until said diametrally reduced portion is encountered whereby to axially compress aid collar portion and bow said bands outwardly so that said expansible sleeve cannot be removed from said wall.

References Cited by the Examiner

UNITED STATES PATENTS

| 375,373 | 12/1887 | May | 85—1 |
| 1,449,625 | 3/1923 | Phillips | 85—68 |
| 2,913,953 | 11/1959 | Tendler | 85—71 |

FOREIGN PATENTS

| 212,600 | 7/1956 | Australia. |
| 176,091 | 4/1917 | Canada. |
| 352,830 | 8/1905 | France. |

CARL W. TOMLIN, *Primary Examiner.*

THOMAS F. CALLAGHAN, *Examiner.*

M. PARSONS, Jr., *Assistant Examiner.*